Sept. 16, 1952     N. E. CLEMENSEN     2,610,489
DRINKING VESSEL
Filed Sept. 20, 1948

INVENTOR.
Niels E. Clemensen
BY
William F. Nickel
ATTORNEY.

Patented Sept. 16, 1952

2,610,489

UNITED STATES PATENT OFFICE 2,610,489

DRINKING VESSEL

Niels E. Clemensen, New York, N. Y.

Application September 20, 1948, Serial No. 50,070

1 Claim. (Cl. 65—13)

My invention is an improved drinking vessel, such as a glass or cup; and particularly a drinking glass adapted to prevent moisture deposited thereon by condensation from wetting the surface on which the vessel is placed.

An important object of this improvement is to provide a drinking glass or the like with a base designed to collect droplets which may run down the sides of the glass; and stop the movement thereof before they reach the bottom of the vessel. Hence the bottom of the glass and the surface supporting it both remain dry and no pad under the vessel is needed.

The objects and advantages of the improvement are clearly set forth herein, but variations in details of structure and arrangement of parts can of course be incorporated without deviation from the general plan of the article or sacrificing any of the characteristics by which the invention is distinguished.

Figure 1:
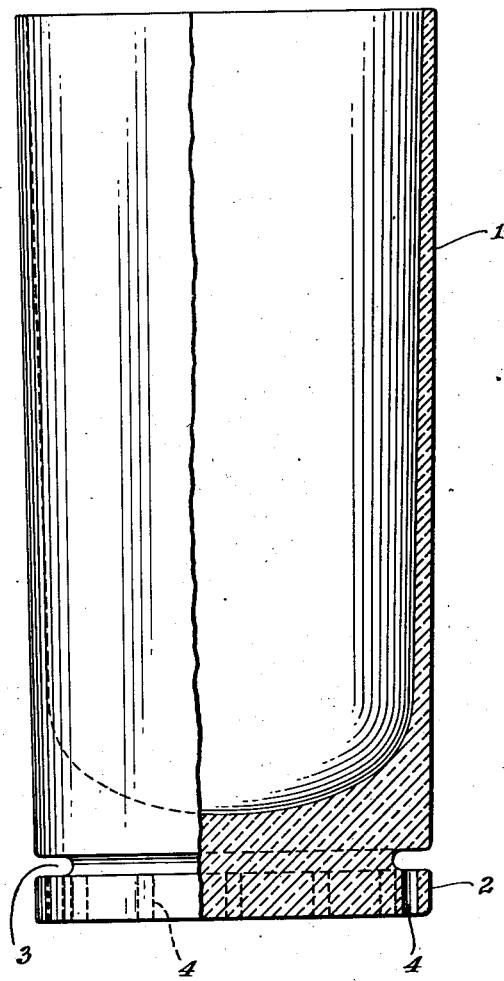
Figure 1 is a longitudinal sectional view of a glass according to my invention.
Figure 2:
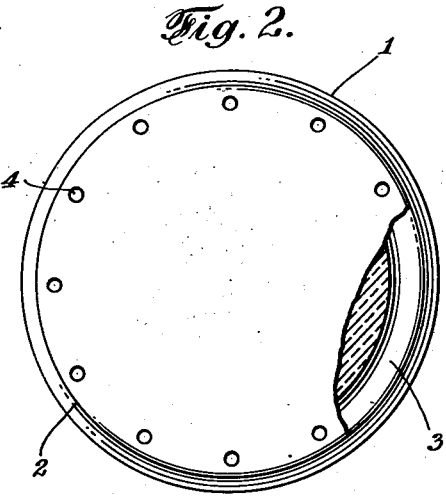
Figure 2 is a bottom plan view thereof.

The body of the glass or the like drinking vessel is indicated at 1. It can be round or have any other shape with a base 2 at the lower end, on which the body usually stands. Above the base is a peripheral groove 3 extending all round the body 1.

The base 2 thus assumes the form of a terminal flange or collar, and any moisture that condenses on the sides of the glass tends to flow downward to the collar, and will gradually collect in the groove 3. When the contents of the glass are cool or contain ice, dew drops will always appear on the exterior surface of the glass, and if they are not arrested, would run down over the bottom flange to wet the table or desk whereon the glass is placed by the user. The surface under the glass is thus tarnished and often the paint or polish thereon is impaired, unless a pad of felt or other absorbent material is used as a protection.

With my invention I can dispense with such a protective pad and still prevent wetting or moistening the surface under the glass. To this end the collar or flange 2 has a number of holes 4 at separated points, extending through it from the upper to the lower face thereof. The holes 4 are all of capillary size and effect and drops of moisture flowing down into the groove 3 and into the holes 4 will not flow through the base, but will be retained by capillary attraction in said holes and therefore the face of the bottom or lower extremity of the vessel will remain dry. The holes 4 thus constitute pits or pockets in which the moisture is retained. The groove 3 adds to the utility of the device because moisture running down the sides of the glass will be drawn into this groove.

When the glass is raised to one's lips for drinking the contents, no moisture will drip from it, because any droplets will be retained by the capillary openings or ducts 4.

However, when the holes 4 appear almost full, the glass can be lifted and a dry cloth rubbed over the face of the bottom. The cloth will effectually absorb and remove whatever liquid is contained in the holes 4 and leave them empty for further action.

The glass is therefore of very simple construction, but well calculated to give the desired results and attain all the objects of the invention.

Having described my invention, what I believe to be new is:

A drinking vessel having a body with a horizontal flange at the lower end, and a horizontal peripheral groove of small height above the flange, the diameter of the flange being substantially equal to the diameter of the body at the upper side of the groove, the flange having small openings at separated points extending through it from the lower side of said groove to the lower face of the flange to retain drops of moisture therein and prevent wetting of the bottom of the vessel and of a surface supporting same.

NIELS E. CLEMENSEN.

REFERENCES CITED

The following references are of record in the file of this patent:

UNITED STATES PATENTS

| Number | Name | Date |
|---|---|---|
| D. 100,579 | Newton | July 28, 1936 |
| 278,205 | Weiss | May 22, 1883 |
| 608,649 | Christiansen | Aug. 9, 1898 |
| 666,313 | Hurley | Jan. 22, 1901 |
| 1,925,913 | Wood | Sept. 5, 1933 |
| 1,953,723 | Quante | Apr. 3, 1934 |
| 2,185,674 | Michel | Jan. 2, 1940 |

FOREIGN PATENTS

| Number | Country | Date |
|---|---|---|
| 16,389 | Great Britain | Sept. 2, 1895 |
| 52,572 | Germany | June 26, 1890 |
| 431,414 | France | Sept. 11, 1911 |
| 558,208 | Germany | Sept. 3, 1932 |
| 623,513 | France | Mar. 21, 1927 |

OTHER REFERENCES

College Physics by A. L. Kimball, 2nd ed., rev., published by Henry Holt and Company, New York 1917, pp. 168, 169.